United States Patent [19]
Youra

[11] 3,777,602
[45] Dec. 11, 1973

[54] DIE FIXTURE AND CONTROL APPARATUS
[75] Inventor: Charles J. Youra, Van Nuys, Calif.
[73] Assignee: Doric Corporation, Oklahoma City, Okla.
[22] Filed: Mar. 28, 1972
[21] Appl. No.: 238,803

[52] U.S. Cl......................... 83/204, 83/400, 83/412, 83/467, 100/DIG. 18, 269/297, 269/305, 408/91, 83/639
[51] Int. Cl.............................................. B26d 5/20
[58] Field of Search........................ 269/63, 69, 297, 269/305, 319, 303; 83/639, 157, 415, 437, 563, 400, 203, 205, 698, 701, 412, 414, 396, 467; 408/91; 241/1 BB; 72/412, 28, DIG. 21, 417, 444; 100/DIG. 18

[56] References Cited
UNITED STATES PATENTS

| | | | |
|---|---|---|---|
| 3,446,106 | 5/1969 | Ferris | 83/400 |
| 2,852,629 | 9/1958 | Sacher | 83/400 X |
| 1,954,708 | 4/1934 | Mass | 269/297 X |

FOREIGN PATENTS OR APPLICATIONS
13,751   9/1965   Japan.................................. 269/305

Primary Examiner—Andrew R. Juhasz
Assistant Examiner—W. D. Bray
Attorney—Jerry J. Dunlap et al.

[57] ABSTRACT

An improved die fixture and control apparatus for positioning a workpiece blank to be formed in a punch press wherein the die fixture is automatically and controllably movable between a stamping station and a loading station at an adjustable, controlled rate of speed and the die fixture delay time at the stamping station and at the loading station are each independently controllable. The die fixture includes a plurality of spaced, identifiable index openings for positioning the lower die element and one or more locators in predetermined, fixed positions, the locators having blank engaging surfaces for engaging a workpiece blank and positioning the workpiece blank in a predetermined position in the die fixture.

21 Claims, 8 Drawing Figures

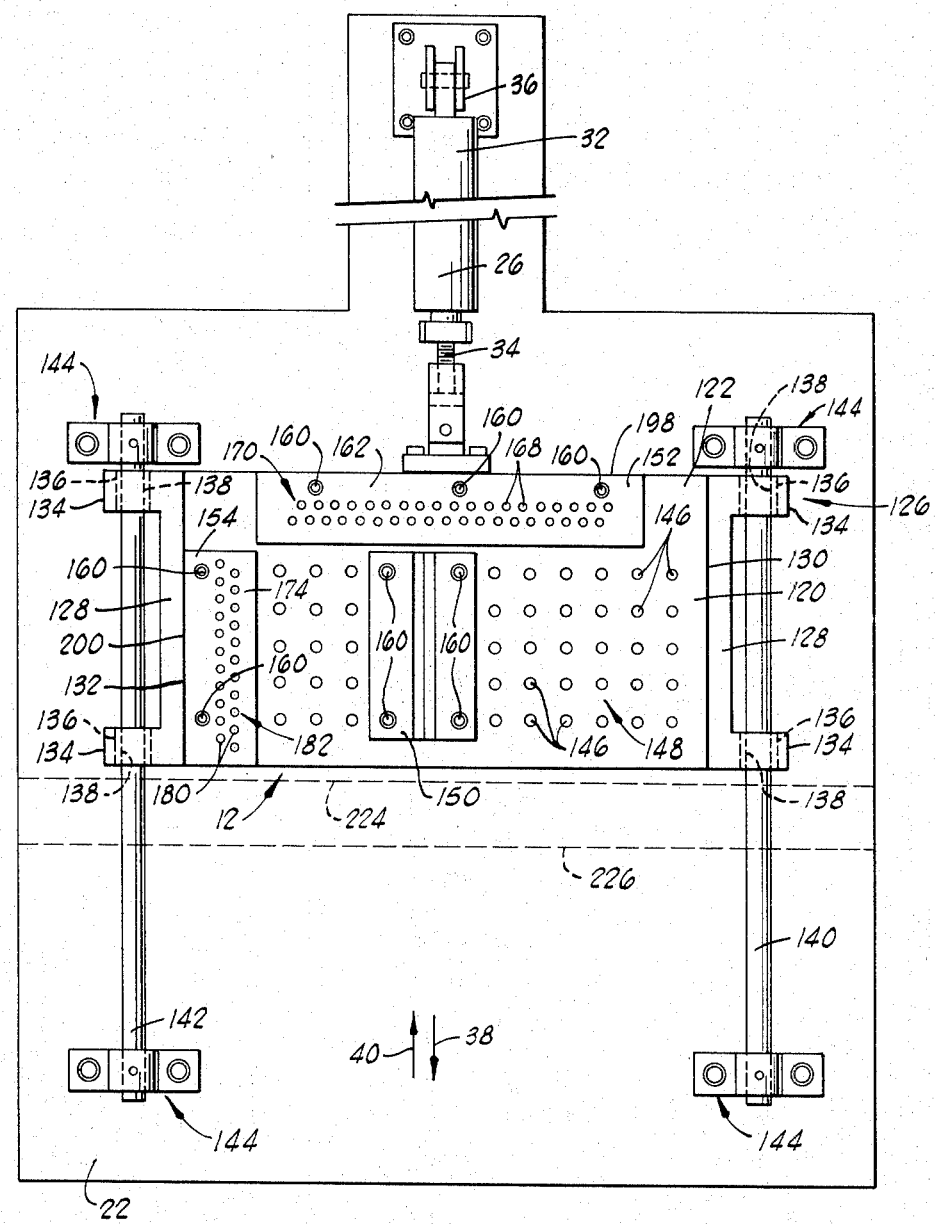
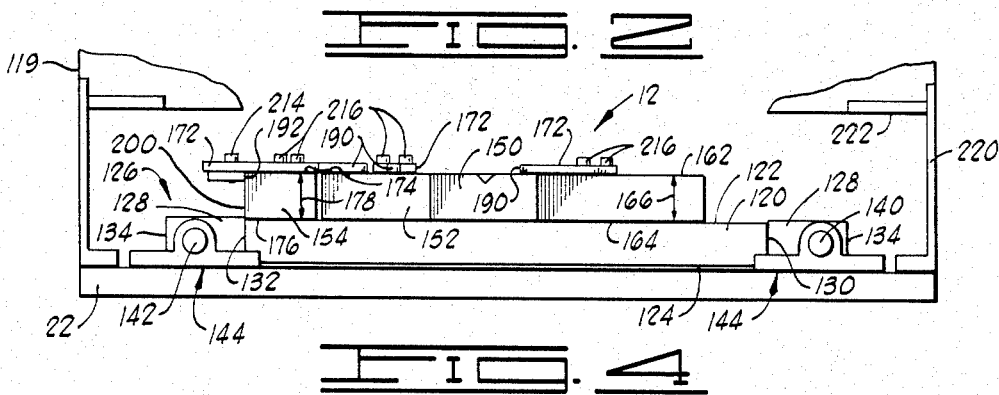

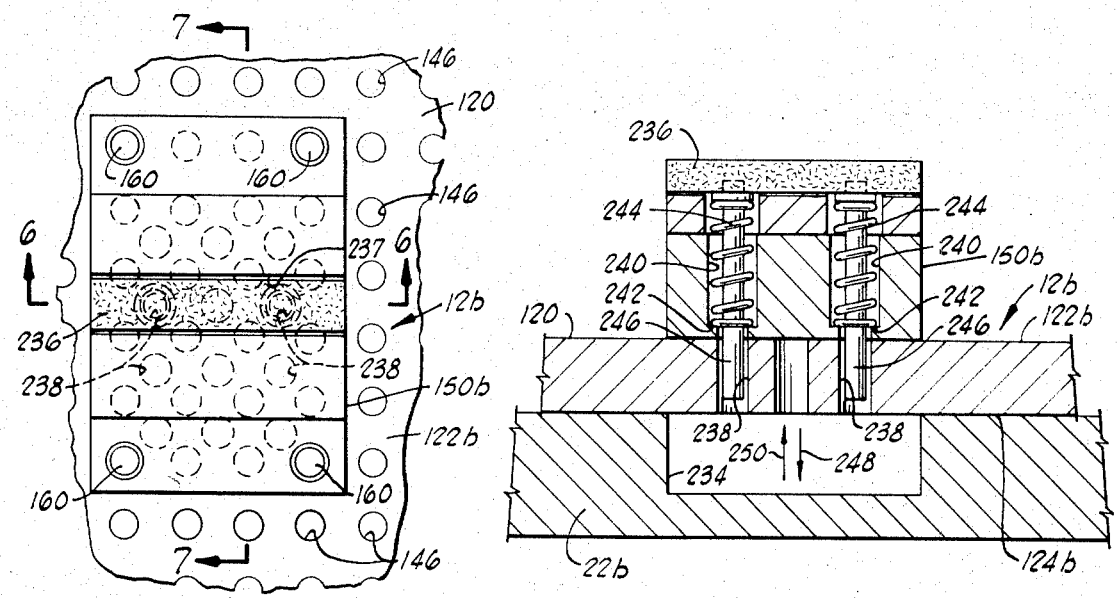
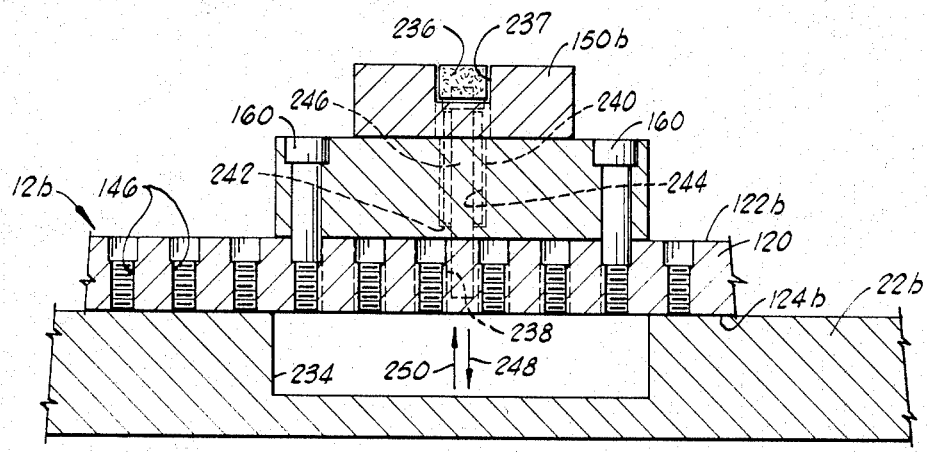
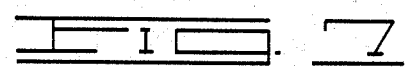
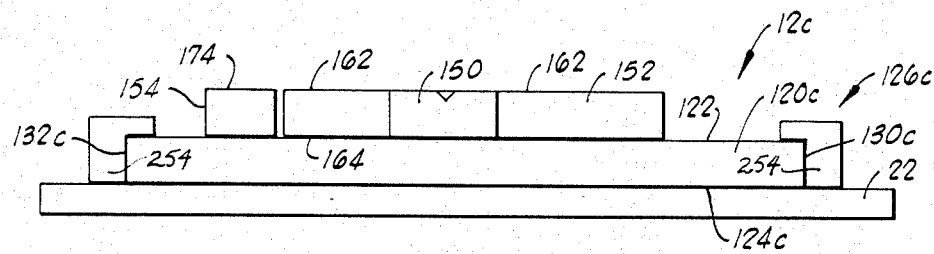
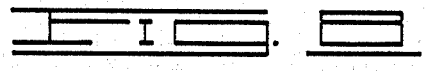

DIE FIXTURE AND CONTROL APPARATUS

BACKGROUND OF THE INVENTION

1. Field of the Invention

This invention relates generally to improvements in die fixtures for punch presses and, more particularly, but not by way of limitation, to an improved workpiece blank positioning apparatus and die fixture control apparatus.

2. Description of the Prior Art

In the past various devices have been constructed for providing some type of removable die fixture assembly which can be assembled in a punch press or the like to provide a predetermined workpiece positioning assembly, these devices being generally in punch press operations wherein relatively small quantities of a particular workpiece are to be formed on an occasional or intermittent basis thereby consuming a considerable amount of so-called "set-up" time to properly position the forming die elements and the workpiece positioning elements prior to each stamping or forming operation of the punch press.

One particular workpiece positioning apparatus was disclosed in the U.S. Pat. No. 3,188,078, issued to Peterson, wherein workpiece positioning stops were detachably located on selected anchoring holes formed in the punch press bolster plates. Each of the positioning stops had a horizontal bore formed therethrough for receiving a micrometer extension. After the positioning stops had been located on the punch press bolster plate, the micrometer extensions were axially moved through the boreholes to engage and position a workpiece blank, the reading on the scales of each micrometer being periodically checked by the operator to assure each micrometer remained properly positioned during the punch press stamping operations.

One other type of workpiece positioning apparatus was disclosed in the U.S. Pat. No. 3,608,886, issued to Greene, wherein a plurality of locator cams were secured in selected reference apertures formed through a table. Each locator cam had a plurality of segmental markings on the face thereof for alignment with a coordinate system marked on the table to rotationally position each locator cam within the selected reference aperture, a portion of the outer edge of each locator cam engaging and positioning the workpiece.

There have also been various punch presses and similar devices constructed in the past wherein the workpiece holding portion thereof was movably positionable for a variety of applications, such as the machine tool disclosed in the U.S. Pat. No. 1,956,110, issued to Turrettini; U.S. Pat. No. 2,566,243, issued to Nyquist; U.S. Pat. No. 3,446,106, issued to Farris; U.S. Pat. No. Re. 18,162, issued to Freeman, U.S. Pat. No. 2,009,487, issued to Ernst; U.S. Pat. No. 2,176,543, issued to Norton, U.S. Pat. No. 2,512,731, issued to Adams; U.S. Pat. No. 3,037,243, issued to Mills; U.S. Pat. No. 2,910,727, issued to Salbeck; U.S. Pat. No. 2,988,234, issued to Barothy; U.S. Pat. No. 2,122,648, issued to Johnson; U.S. Pat. No. 2,613,823, issued to Johns; and U.S. Pat. No. 2,763,229, issued to Sahlin; for example.

SUMMARY OF THE INVENTION

An object of the invention is to provide an improved die fixture wherein the workpiece locating elements are removably positionable in predetermined, controlled locations in a faster, more positive, and more efficient manner.

Another object of the invention is to provide an improved die fixture wherein the time required to positively position the lower die element and the workpiece positioning locators thereon is substantially reduced.

One other object of the invention is to provide an improved control apparatus for automatically moving die fixture to a loading station and to a stamping station wherein the rate of travel of the die fixture, and the delay times of the die fixture at the stamping station and the loading station are each independently controllable in a more efficient manner.

An additional object of the invention is to provide an improved die fixture wherein the workpiece locators are positively positioned thereon in a manner virtually eliminating visual alignment requirements.

Yet another object of the invention is to provide an improved die fixture and control apparatus which operates in a substantially safer manner, yet provides an increased operational efficiency.

Another object of the invention is to provide an improved die fixture and control apparatus which is economical in construction and operation.

Other objects and advantages of the invention will be evident from the following detailed description when read in conjunction with the drawings which illustrate various embodiments of the invention.

BRIEF DESCRIPTION OF THE DRAWINGS

FIG. 2 is a plan view of the die fixture of FIG. 1.

FIG. 4 is a front elevational view of the die fixture of FIGS. 1, 2 and 3.

FIG. 5 is a fragmentary, plan view of a modified die fixture.

FIG. 6 is a cross-sectional view of the modified die fixture of FIG. 5, taken substantially along the line 6—6 of FIG. 5.

FIG. 7 is a cross-sectional view of the modified die fixture of FIGS. 5 and 6, taken substantially along the line 7—7 of FIG. 5.

FIG. 8 is a front-elevational view similar to the front-elevational view of FIG. 4, but showing another modified die fixture.

DESCRIPTION OF THE PREFERRED EMBODIMENTS

Figure 1:
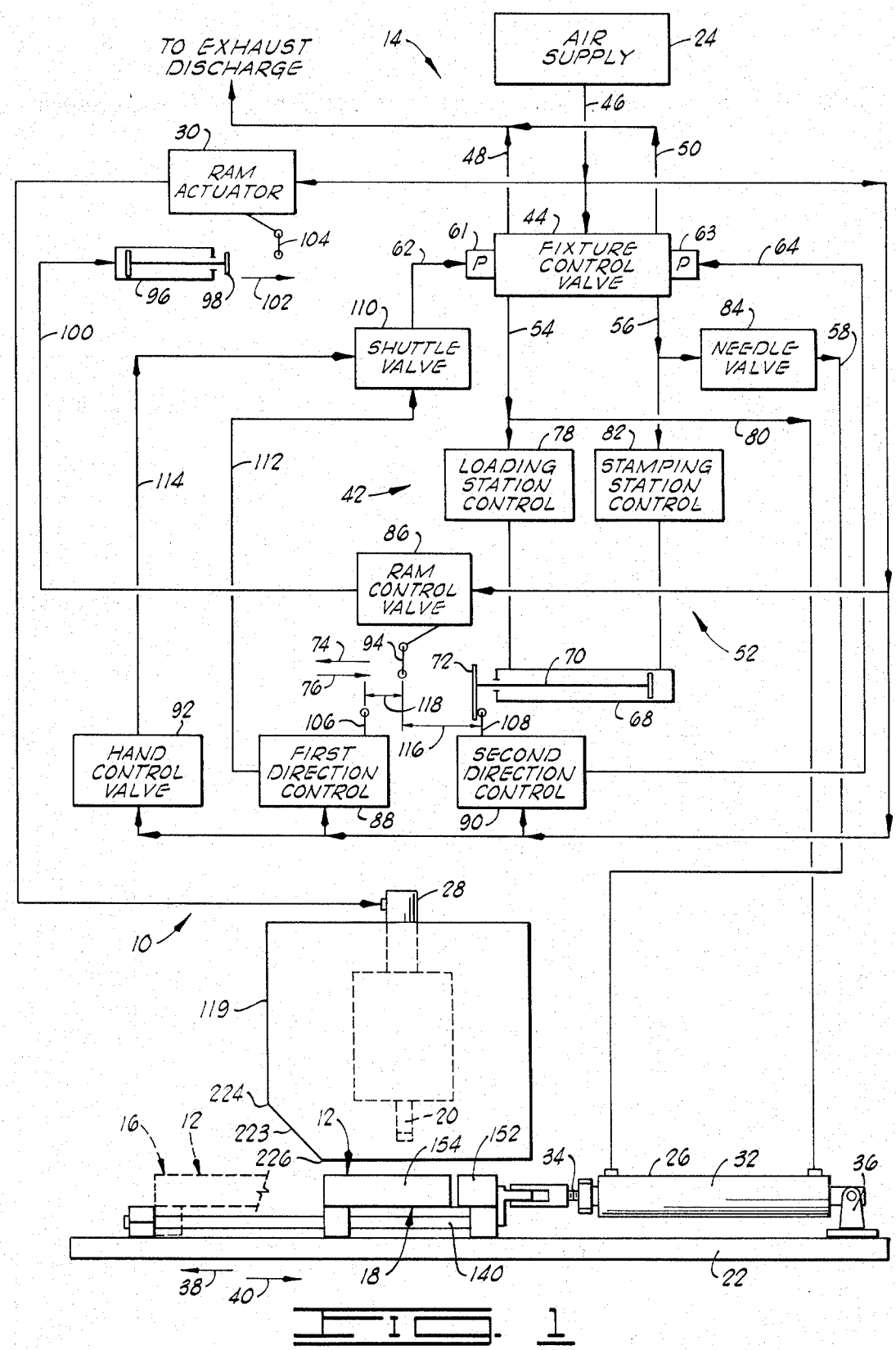
FIG. 1 is a diagrammatical side elevational view of the die fixture and a schematic view of the die fixture and control apparatus of the present invention.

Referring to the drawings in general, and to FIG. 1 in particular, shown therein and designated by the general reference numeral 10 is a die fixture and control apparatus for positively positioning a workpiece blank in a fixed, predetermined position so that a particular shape or form can be subsequently imparted thereto in a faster, more efficient, safer and more economical manner. In one aspect, the present invention contemplates an improved punch press wherein the loading and the forming of a workpiece blank is accomplished in a safer, more efficient and more economical manner, as will be described in greater detail below, The die fixture and control apparatus 10 generally includes: a die fixture 12 for securely supporting a lower die element and providing a predetermined workpiece nest for accurately positioning the workpiece blank in the die fixture 12; and a control apparatus 14 for automatically moving the die fixture 12 to a loading station 16 (shown in dashed-lines in FIG. 1) wherein the operator loads a workpiece blank in the die fixture 12 and to stamping station 18 wherein a predetermined form or shape is imparted to the workpiece blank. The die fixture and control apparatus 10 is particularly constructed to be utilized in cooperation with a punch press (portions of the punch press being schematically indicated in the drawings in dashed-lines), having an upper punch element 20 (shown in dashed-lines in FIG. 1) secured to a movable ram portion of the punch press and aligned with a lower die element which is securedly positioned in the die fixture 12, and a fixture support plate 22 which is secured to the punch press bolster plate (not shown), sometimes referred to below as the punch press fixture support plate 22. The punch press is constructed to move the upper punch element 20 into engagement with the workpiece blank to impart, in cooperation with the lower die element, a predetermined form or shape to the workpiece blank in an actuated stamping position of the punch press and in the stamping station 18 position of the die fixture 12, the construction and operation of such punch presses being well known to the art.

The control apparatus 14 generally includes: an air supply 24 supplying pressurized control air or the like to the various pneumatically-operated components and assemblies of the control apparatus 14; die fixture actuator 26, having a portion connected to the air supply 24; and a ram controller 28, having a portion connected to the air supply 24 via a ram actuator 30. it should be specifically noted that, although the control apparatus 14 is described herein as utilizing a control air supply 24, each or, in one form, any one or more of the various components and assemblies of the control apparatus 14 can be hydraulically, pneumatically, or electrically operated, the necessary modifications to incorporate such components and assemblies in the control apparatus 14 will be apparent to those skilled in the art in view of the detailed description of the construction and the operation of the die fixture and control apparatus 10 contained herein.

As shown in FIG. 1, die fixture actuator 26 is, more particularly, a pneumatically operated double-acting cylinder having a base 32 and a rod 34 reciprocatingly disposed through one end thereof. The end of the base 32, opposite the rod 34 end thereof, is pivotally connected to the fixture support plate 22 via a support 36, and the end of the rod 34, opposite the end thereof reciprocatingly disposed through the base 32, is secured to the die fixture 12. The die fixture 12 is movably supported on the fixture support plate 22 and the die fixture actuator 26 is connected to the air supply 24 and to the die fixture 12 to move the die fixture 12 in a loading direction 38, in one actuated position thereof, and to move the die fixture 12 in a stamping direction 40, in one other actuated position thereof, during the operation of the die fixture and control apparatus 10, for reasons and in a manner to be described in greater detail below.

As shown in FIG. 1, a fixture control assembly 42 is interposed between the air supply 24 and the die fixture actuator 26. The fixture control assembly 42 is constructed to adjustably control the die fixture rate of travel, the stamping station delay time and the loading station delay time, in a manner to be described in greater detail below.

A fixture control valve 44 is interposed between the air supply 24 and the die fixture actuator 26, the fixture control valve 44 being, more particularly, connected to the air supply 24 via a conduit 46. In a preferred form, the fixture control valve 44 is of the type generally referred to in the art as a four-way double pilot valve having two discharge ports connected to an exhaust discharge (not shown) via conduits 48 and 50, and two outlet ports, each outlet port being connected to a timing control 52 via a pair of conduits 54 and 56, the conduit 56 being connected to a portion of the die fixture actuator 26 via a middle valve 84 and a conduit 58. The fixture control valve 44 has a pair of pilot connections 61 and 63, each pilot connection 61 an 63 being connected to the air supply 24 (the pilot connections 61 and 63 of the fixture control valve 44, being designated in FIG. 1 by the letter-reference "P"). More particularly, the pilot connection 61 receives control air via a conduit 62 and the pilot connection 63 receives control air via the conduit 64. The fixture control valve 44, as shown in FIG. 1, has one actuated position wherein the air supply 24 is connected to the timing control 52 via the conduits 46 and 54, and one other actuated position wherein the air supply 24 is connected to the timing control 52 via the conduits 46 and 56, the fixture control valve 44 being moved to the actuated positions in response to the pressurized air being connected to the pilot connections 61 and 63 via the conduits 62 and 64 during the operation of the control apparatus 14, in a manner to be described in greater detail below.

The conduits 54 and 56 are each connected to a pneumatically operated timing actuator 68, the timing actuator 68 being, more particularly and in a preferred form, double-acting pneumatic cylinder and the conduits 54 and 56 each being connected to one of the port openings of the timing actuator 68. As diagramatically indicated in FIG. 1, the timing actuator 68 has a rod 70 reciprocatingly disposed therein and a trip plate 72 is connected to the end of the rod 70, opposite the end thereof reciprocating disposed in the timing actuator 68. The timing actuator 68 is constructed such that, in one actuated position of the control valve 44 wherein the pressurized air is connected to the timing actuator 68 via the conduit 56, the rod 70 thereof is moved in a general direction 74 and such that, in one other actuated position of the fixture control valve 44 wherein the pressurized air is connected to the timing actuator 68 via the conduit 54, the rod 70 thereof is moved in a direction 76, generally opposite the direction 74, for reasons which will be made apparent below.

A loading station control 78 interposed in the conduit 54 generally between the fixture control valve 44 and the timing actuator 68, the conduit 54 being connected to the die fixture actuator 26 via a conduit 80 connected generally between the fixture control valve 44 and the loading station control 78. A stamping station control 82 is interposed in the conduit 56, generally between the fixture control valve 44 and the timing actuator 68 and the conduit 56 is, more particularly, connected to the die fixture actuator 26 via the conduit 58 connected generally between the fixture control valve 44 and the stamping station control 82, a needle valve 84 being interposed in the conduit 58 generally between the fixture control valve 44 and the die fixture actuator 26.

The air supply 24 is also connected to the ram actuator 30, a ram control valve 86, a first direction control 88, a second direction control 90 and a hand control valve 92 via the conduit 46. The ram control valve 86 has an opened and a closed position and is, in a preferred form, a three-way valve, having a trip arm 94, the ram control valve 86 being normally closed and tripped to the open position via the engagement between the trip plate 72 and the trip arm 94.

The ram control valve 86 is connected to a trip cylinder 96, having a trip plate 98, via a conduit 100, the trip cylinder 96 being, in a preferred form, a pneumatically operated, single acting cylinder having a piston rod reciprocatingly disposed therein and the trip plate 98 being secured on one end of the piston rod. The trip cylinder 96 is constructed to move the trip plate 98 connected thereto in a general direction 102 in an open position of the ram control valve 86 connecting the air supply 24 to the trip cylinder 96.

The ram actuator 30 has an opened and a closed position and, in a preferred form, is a three-way valve, having a trip arm 104, the ram actuator 30 being normally closed and tripped to the opened position in an engaged position of the trip arm 104. The trip cylinder 96 is disposed with respect to the ram actuator 30 such that, when the trip cylinder 96 is actuated via the opening of the ram control valve 86, the trip plate 98 is moved in a direction 102 engaging the trip arm 104, thereby opening the ram actuator 30 connection the air supply 24 to the ram controller 28 during one portion of the operation of the control apparatus 14.

The first direction control 88 and the second direction control 90 each have an opened and a closed position and, in a preferred form, the first and the second direction controls 88 and 90 are each three-way valves, having trip arms 106 and 108, respectfully. The first direction control 88 is normally closed and actuated to the open position by the engagement between the trip plate 72 of the timing actuator 68 and the trip arm 106 of the first direction control 88, thereby connecting the air supply 24 to the pilot connection 61 via a shuttle valve 110 and a conduit 112.

The hand control valve 92 has an opened and a closed position and is, in a preferred form, a three-way valve which is preferably mounted in closed proximity to the punch press operator and constructed such that the hand control valve 92 is normally closed and tripped open by the punch press operator to stop the operation of the die fixture and control apparatus 10. In the opened position of the hand control valve 92, the air supply 24 is connected to the pilot connection 61 via the shuttle valve 110 and a conduit 114 returning the die fixture 12 to the loading station 16 position, in an actuated or tripped open position of the hand control valve 92. The shuttle valve 110 is thus constructed to connect the air supply 24 to one of the pilot connection 61 of the fixture control valve 44 via the first direction control 88 in a tripped open position thereof and via the hand control valve 92 in a tripped open position thereof.

The loading station control 78 is, in a preferred form, a flow control valve constructed to provide a virtually unobstructed flow of fluid from the timing actuator 68 toward the fixture control valve 44 through the conduit 54 and to provide a variably adjustable flow of fluid from the fixture control valve 44 toward the timing actuator 68 via the conduit 54. The loading station control 78 thus adjustably controls the flow of fluid to actuate the timing actuator 68 to variably control the rate at which the reciprocating piston rod 70 moves in a direction 76 to engage the trip arm 108 of the second direction control 90, thereby controlling the loading station delay time wherein the control apparatus 14 maintains the die fixture 12 positioned at the loading station 16, in a manner to be made more apparent below.

The stamping station control 82 is, in a preferred form, also a flow control valve wherein the flow of fluid from the fixture control valve 44 to the timing actuator 68 via the conduit 56 is variably adjustable and the flow of fluid through the stamping station control 82 from the timing actuator 68 towad the fixture control valve 44 is virtually unobstructed, thereby permitting a free-flowing discharge of fluid from one portion of th timing actuator 68. The stamping station control 82 thus adjustably controls the flow of fluid to actuate the timing actuator 68 to variably control the rate at which the reciprocating piston rod 70 moves in a direction 74 to engage the trip arm 106 of the first direction control 88, thereby controlling the stamping station delay time wherein the control apparatus 14 maintains the die fixture 12 positioned at the stamping station 18, in a manner to be made more apparent below.

The ram controller 28 is, in a preferred form, a single-actuating cylinder which is connected to the air supply 24 and to the punch press to position the punch press in an actuated stamping position wherein the upper punch element 20 is moved into forming engagement with the workpiece blank, in an actuated position of the ram controller 28; that is, a position wherein the ram actuator 30 is tripped to the open position and the air supply 24 is connected through the ram actuator 30 to the ram controller 28.

Assuming that the die fixture 12 is in the loading station 16 position (shown in dashed-lines in FIG. 1) the timing actuator 68 is connected to the air supply 24 via the fixture control valve 44 and the loading station control 78 and the piston rod 70 thereof is biased in a direction 76 to a position engaging trip arm 102 of the second direction control 90, thereby opening the second direction control 90 and connecting the air supply 24 to the pilot connection 63 of the fixture control valve 44 via the conduit 64. When the fixture control valve 44 is actuated via the pilot connection 63 receiving pressurized air from the air supply 24 through the second direction control 90, the fixture control valve 44 is positioned to connect the air supply 24 to the timing actuator 68 via the conduit 56 and the stamping station control 82 moving the rod 70 of the timing actuator 68 in a direction 74 and connecting the air supply 24 to the die fixture actuator 26 via the conduits 46, 56, and 58, the die fixture actuator 26 being positioned to move the die fixture 12 in a direction 40 to the stamping station 18 position.

After the stop plate 72 has been moved via the timing actuator 68 in a direction 74 through a distance 116, the stop plate 72 will engage the trip arm 94 of the ram control valve 86, thereby positioning the ram control valve 86 in an opened position connecting the air supply 24 to the trip cylinder 96 and actuating the trip cylinder 96. In an actuated position of the trip cylinder 96, the trip plate 98 will be biased in a general direction 102 into engagement with the trip arm 104 of the ram actuator 30, thereby biasing the ram actuator 30 to an opened position connecting the air supply 24 to the ram controller 28 and positioning the punch press in an actuated stamping position wherein the upper punch element 20 is moved into stamping or forming engagement with the workpiece blank.

After the ram control valve 86 has been actuated via the timing actuator 68, the trip plate 72 of the timing actuator 68 will continue to move in the general direction 74 a distance 118 to a position wherein the trip plate 72 engages the trip arm 106 of the first direction control 88 biasing or tripping the first direction control 88 to the opened position thereof connecting air supply 24 to the pilot connection 61 of the fixture control valve 44 via the conduits 46, 112 and 62. When the fixture control valve 44 is actuated via the pilot connection 61 receiving pressurized air from the air supply 24 through the first direction control 88, the fixture control valve 44 is positioned to connect the air supply 24 to the timing actuator 68 via the conduit 54 and the loading station control 78 moving the rod 70 of the timing actuator 68 in a direction 76 and connecting the air supply 24 to the die fixture actuator 26 via the conduits 46, 54 and 80, the die fixture actuator 26 being positioned to move the die fixture 12 in a direction 38 to the loading station 16 position.

The control apparatus 14 is thus constructed to automatically move the die fixture 12 to the loading station 16 and to the stamping station 18 at controlled, predetermined intervals of time during the operation of the die fixture and control apparatus 10. As indicated in FIG. 1, the die fixture 12 is disposed generally under a guard 119 and, more particularly, the guard 119 protectively encompasses a substantial portion of the die fixture 12 and lower die element supported thereon and the upper punch element 20 in the stamping station 18 position of the die fixture 12, during the operation of the die fixture and control apparatus 10, for reasons and in a manner to be described in greater detail below.

Figure 3:
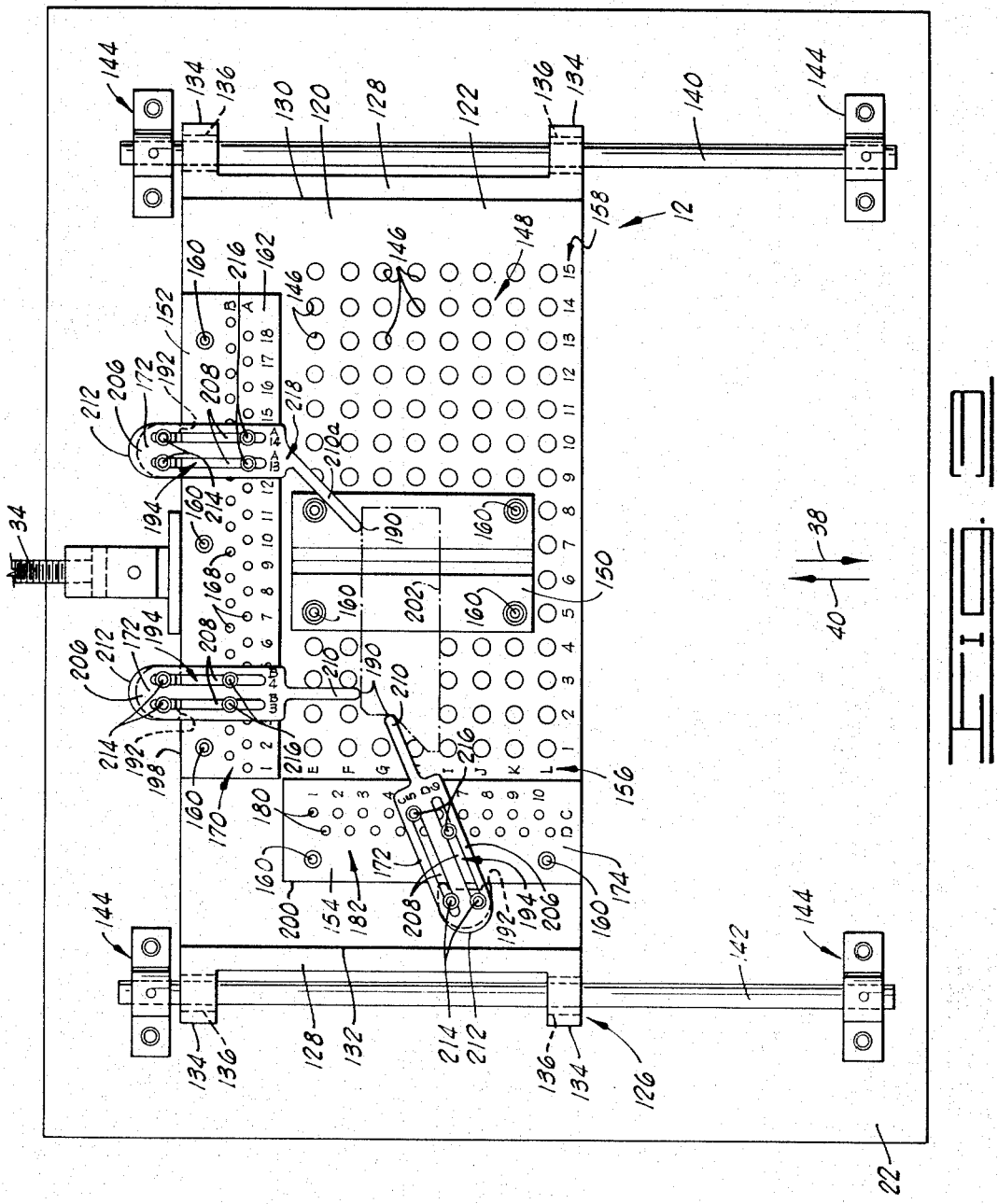
FIG. 3 is an enlarged, plan view of the die fixture, FIGS. 1 and 2.

As shown more clearly in FIGS. 2, 3 and 4, the die fixture 12 includes a base 120 having an upper face 122 and a lower face 124. the base 120 is supported on the fixture support plate 22 of the punch press (not shown) via a base support 126 and, in one preferred form, the die fixture 12 is constructed such that the base 120 is supported generally above the fixture support plate 22 via the base support 126, as shown more clearly in FIG. 4, thereby reducing sliding friction between the lower face 124 of the base 120 and the fixture support plate 22 during the operation of the die fixture and control apparatus 10.

The base support 126, more particularly, includes a pair of flange connectors 128, one of the flange connectors 128 being secured to one side 130 of the base 120 and the other flange connector 128 being secured to the opposite side 132 of the base 120. Each flange connector 128 includes a pair of guide flanges 134 formed thereon and extending a distance therefrom, each guide flange 134 being, more particularly, formed on one end of one of the flange connectors 128. A guide opening 136 is formed through each guide flange 134, and in a preferred form as shown in FIG. 2, a bushing 138 is secured in each guide opening 136.

In the assembled position of the flange connectors 128 to he base support 126, the guide openings 136 formed through the flange connectors 128 connectd to the side 130 of the base 120 are generally aligned and sized for slidingly receiving a guide rod 140, and the guide openings 136 formed through the guide flanges 134 connected to the flange connector 128 connected to the side 132 of the base 120 are generally aligned and sized to slidingly receive a guide rod 142.

The base support 126 thus includes the guide rods 140 and 142, the guide rod 140 an 142 each being secured to the fixture support plate 22 of the punch press (not shown) and securedly supported in an assembled position via a guide rod support 144 connected to the opposite ends of the guide rods 140 and 142. The base support 126 thus supports the base 122 in an assembled position and defines a guide path for maintaining the die fixture 12 in a predetermined path of travel as the die fixture 12 is moved in a loading direction 38 and a stamping direction 40 via the die fixture actuator 26.

As shown in FIGS. 2 and 3, a plurality of base index openings 146 are formed in the upper face 122 of the base 120 (only some of the base index openings 146 being designated by a reference numeral in FIGS. 2 and 3 for the purpose of clarity of description). In a preferred form, the base index openings 146 are each threaded and spaced on the upper face 122 of the base 120 to provide a predetermined base index pattern 148 for locating a lower die element 150, a horizontal support 152 and a vertical support 154 in predetermined, controlled positions on the upper face 122 of the base 120.

Each base index opening 146 is, more particularly, located in the upper face 122 of the base 120 and positioned such that the location of each base index opening 146 is identifiable via locating indicia. More particularly, in the embodiment shown in FIGS. 2 and 3, the base index openings 146 are located and spaced to form a base index pattern 148 wherein the base index openings 146 are generally aligned in horizontal and vertical rows, each base index opening being identifiable via a vertical indicia 156 (each horizontal row of base index openings 146 being identifiable by one of the letters "E" through "L") and horizontal indicia 158 (each vertical row of base index openings 146 being identifiable by one of the numerals 1 through 5). Thus, in this form of base index pattern 148, each base index opening 146 is identifiable via one of the letters of the vertical locating indicia 156 identifying the horizontal row corresponding the particular vertical locating indica 156 and one of the numerals of the horizontal locating indicia 158 identifying the vertical row corresponding to the particular vertical locating indicia 158.

The lower die element 150 is secured to the upper face 122 of the base 120 via a plurality of threaded fasteners 160, each threaded fastener 160 being threadedly secured in one of the base index openings 146 to secure the lower die element 150 in an assembled position. In one form, one of the vertical locating indicia 156 and one of the horizontal locating indicia 158 are associated with each of the openings in the lower die element 150 through which one of the threaded fasteners 160 extends, each pair of vertical locating indicia 156 and horizontal locating indicia 158 identifying the particular base index opening 146 through which the particular threaded fastener 160 is to be secured. Thus, the vertical locating indicia 156 and the horizontal locating indicia 158 associated with each of the openings in the lower die element 150 positively define the position of the lower die element 150 on the upper surface 122 of the base 120.

As shown more clearly in FIGS. 2 and 3, the horizontal support 152 and the vertical support 154 are also secured to the upper surface 122 of the base 120 via threaded fasteners 160. In one form, one of the vertical locating indicia 156 and one of the horizontal locating indicia 158 are associated with each of the openings through the horizontal support 152 receiving the threaded fasteners 160, in a manner similar to that described before with respect to the lower die element 150 and the threaded fasteners 160, such that the horizontal support 152 can be secured in predetermined positions on the upper surface 122 of the base 120. Also, in one form, one of the vertical locating indicia 156 and one of the horizontal locating indicia 158 are associated with each of the openings through the vertical support 154 receiving one of the threaded fasteners 160, in a manner similar to that described before with respect to the lower die element 150 and the threaded fasteners 160, such that the vertical support 154 can also be secured in predetermined positions on the upper surface 122 of the base 120.

The horizontal support 152 is basically rectangularly shaped and has an upper face 162 and a lower face 164, the lower face 164 of the horizontal support 152 being disposed generally adjacent to the upper face 122 of the base 120, and the upper face 162 of the horizontal support 152 being disposed a distance 166 above the upper face 122 of the base 120 in a horizontal plane generally coplanar with the horizontal planar disposition of the upper face 122 of the base 120. A plurality of horizontal support index openings 168 are formed in the upper face 162 of the horizontal support 152. The horizontal support index openings 168 are each identifiable via locating indicia, and disposed and spaced on the upper face 162 of the horizontal support 152 to form a horizontal support index pattern 170 for positioning one or more locators 172 in predetermined positions on the upper face 162 of the horizontal support 152 (two locators 172 being disposed on the upper face 162 of the horizontal support 152 in FIG. 3, for example).

In one form and as shown in FIGS. 2 and 3, the horizontal support index openings 168 are spaced on the upper face 162 of the horizontal support 152 to form a horizontal support index pattern 170 wherein the horizontal support index openings 168 are disposed in two horizontally extending rows (one of the rows being designated in FIG. 3 by the letter-reference "A" and the other row being designated in FIG. 3 by the letter-reference "B"). Also, in one form, the horizontal support index openings 168 are spaced on the upper face 162 of the horizontal support 152 to form angularly oriented vertical rows wherein the horizontal support index openings 168 in one row are offset with respect to the horizontal support index openings 168 in the other row for positioning the locators 172 in predetermined angular positions (each of the vertical rows being designated by a numeral-reference on the upper face 162 of the horizontal support 152).

The vertical support 154 is basically rectangularly shaped and has an upper face 174 and a lower face 176, the lower face 176 being disposed generally adjacent to the upper face 122 of the base 120, and the upper face 174 being disposed a distance 178 in a horizontal plane generally above the upper face 122 of the base 120, and the horizontal planar disposition of the upper face 174 being generally coplanar with the horizontal planar disposition of the upper face 122 of the base 120. A plurality of vertical support index openings 180 are formed in the upper face 174 of the vertical support 154. The vertical support index openings 180 are each identifiable via locating indicia, and disposed and spaced on the upper face 174 to form a vertical support index pattern 182 for positioning one or more of the locators 172 in predetermined positions on the upper face 174 of the vertical support 154 (one locator 172 being disposed on the upper face 174 of the vertical support 154 in FIG. 3, for example).

In one form and as shown in FIGS. 2 and 3, the vertical support index openings 180 are spaced on the upper face 174 of the vertical support 154 to form a vertical support index pattern 182 wherein the vertical support index openings 180 are disposed in two vertically extending rows (one of the rows being designated in FIG. 3 by the letter-reference "C" and the other row being designated in FIG. 3 by the letter-reference "D"). Also, in one form, the vertical support index openings 182 are spaced on the upper face 174 to form angularly oriented horizontal rows wherein the vertical support index openings 182 in one row are offset with respect to the vertical support index openings 184 in the other row for positioning the locators 172 in predetermined angular positions (each of the horizontal rows being designated by a numeral-reference on the upper face 174 of the vertical support 154).

The locators 172 each include a blank engaging surface 190, a stop surface 192 and locator opening 194 formed through a portion of each locator. In an assembled position of the die fixture and control apparatus 10, each locator 172 is removably secured in a predetermined position on one of the upper surfaces 162 and 174 of the horizontal and the vertical supports 152 and 154 to securedly and positively position each locator 172 in one direction, and the stop surfaces 192 of each locator 172 engage one of the engaging surfaces 198 and 200, the engaging surface 198 being formed on the horizontal support 152 and the engaging surface 200 being formed on the vertical support 154, to securedly and positively position each of the locators 172 in one other direction. More particularly, each of the locators 172 are positioned in a predetermined position on one of the upper faces 162 and 174 of the horizontal and the vertical supports 152 and 154 such that the blank engaging surfaces 190 of each of the locators 172 are disposed in a predetermined position to engage a portion of a workpiece blank 202 (shown in dashed-lines in FIG. 3) to position the workpiece blank 202 in a predetermined, controlled position with respect to the lower die element 150.

More paticularly, each of the locators 172 includes a locator base 206 having a pair of elongated openings 208 formed therethrough, the elongated openings 208 formed through each locator base 206 comprising the locator opening 194 through each locator 172. An elongated finger element 210 is formed on one end of each of the locator bases 206, the finger element 210 extending a distance from the locator base 206 connected thereto. In one form, the finger elements 210 extend generally perpendicularly from the base 206 and, in one other form, one or more of the locators 172 are constructed such that the finger elements 210 formed thereon extend generally angularly from the base 206 (one of the locators 172 being shown in FIG. 3 having an angularly oriented finger element 210a, for example). In a preferred form, the stop surfaces 192 formed on the locators 172 is, more particularly, formed by a stop element 212 which is removably secured to the locators 172 via threaded fasteners 214, one of the threaded fasteners 214 extending through each of the openings 208 to threadingly engage and securely connect one of the stop elements 212 to each of the locators 172.

Each of the locators 172 is, more particularly, secured to one of the upper faces 162 and 174 of the horizontal and the vertical supports 152 and 154 via a pair of threaded fasteners 216, each threaded fastener 216 extending through one of the elongated openings 208 into threaded engagement with a predetermined index opening of one of the horizontal and the vertical support index patterns 170 and 182. In a preferred form, a pair of locating indicia are marked on the upper surface of each of the locator bases 206, each pair of locating indicia being associated with one of the elongated openings 208 (only one of the locating indicia 218 on one of the locators 172 being designated in FIG. 3 for the purpose of clarity of description).

In an assembled position, each locator 172 is positioned on one of the upper faces 162 and 174 to a position wherein the stop surface 192 of each stop element 212 engages one of the engaging surfaces 198 and 200, thereby positively positioning the locators 172 in one direction. Each of the locators 172 is then positioned on one of the upper faces 162 and 174 to a position wherein the elongated openings 208 are disposed generally above and aligned with the index opening identified with the particular elongated opening 208 via the locating indicia 218, one of the threaded fasteners 216 being secured through each elongated opening 208 and through the index openings designated by the locating indicia 218 to secure each locator 172 in a predetermined position on one of the upper faces 162 and 174. The threaded fasteners 216 and the elongated openings 208 are sized such that the threaded fasteners 216 engage the surfaces formed in the locator bases 206 by the elongated openings 208 to position each locator 172 in a direction generally perpendicular to the elongated opening, thereby cooperating with the stop surface 192 of the stop elements 212 to securely position each locator 172 in one predetermined position on one of the upper faces 162 and 174 of the horizontal and the vertical support 152 and 154. In this position of each of the locators 172, the blank engaging surfaces 190 of the locators 172 cooperate to engage portions of the workpiece blank 202 to position the workpiece blank 202 in a predetermined position with respect to the lower die element 150, during the operation of the die fixture and control apparatus 10.

Thus, locating indicia are marked on each of the locators 172, the horizontal and the vertical supports 152 and 154 and on the associated lower die element 150, the marked locators 172, the marked supports 152 and 154 and the marked die element providing a permanent assembly which can be assembled and disassembled on the base 120 in a fast, efficient and positive manner. In one operational embodiment, each of these marked components and assemblies are then stored for future assembly on the base 120, thereby providing a permanent, yet removable, assembly for subsequent workpiece forming operations.

The guard 119, generally described before, encompasses the upper portion of the die fixture 12, the upper punch element 20 and a portion of the ram actuating components at the punch press when the die fixture 12 is in the stamping station 18, as diagrammatically indicated in FIG. 1, thereby substantially preventing an individual's hand from being positioned near the engaging portions of the punch press during the stamping operation and substantially reducing the possibility of injuries. During the operation of the die fixture and control apparatus 10, the die fixture 12 is automatically moved to a position wherein the operator can position the workpiece blank on the die fixture 12, and subsequently moved under the protective covering provided via the guard 119 to the stamping station 18.

The guard 119, as shown more clearly in FIGS. 1 and 4, is supported on the fixture support plate 22 via a guard support 220 having a guard opening 222 formed through a front portion thereof. The guard 119 has a tapered front portion on 223 forming guard edges 224 and 226, the guard edge 226 forming the upper edge of the guard opening 222. The guard opening 222 is sized such that the die fixture 12 can be moved therethrough to the loading station 16 and the stamping station 18, and the guard edge 226 is disposed in a horizontal plane allowing a minimum clearance between the lower guard edge 226 and the die fixture 12 to further reduce the opportunity of the operator's hand being disposed near the workpiece forming portions of the punch press during the stamping operation. The tapered portion 223 of the guard 119 permits the guard 119 to be constructed to efficiently encompass the portions of the punch press and die fixture 12 and yet position the guard edge 226 immediately over the die fixture 12 at a position reducing the distance of travel required to move the die fixture 12 to the loading station 16 (the relative positions of the guard edges 224 and 226 being indicated in FIG. 2 in dashed-lines).

Operation of FIGS. 1 Through 4

The die fixture and control apparatus 10, described before, is particularly useful in connection with punch press operations wherein a relatively small quantity of workpiece blanks are formed on an intermittent basis requiring various upper punch elements, lower die elements and workpiece blank positioning assemblies to be periodically assembled and disassembled in the punch press. The die fixture 12 is thus constructed to provide a punch press assembly for imparting a plurality of predetermined shapes and forms to predetermined workpiece blanks wherein each assembly for imparting a particular predetermined shape or form to predetermined workpiece blank can be assembled and disassembled on the base 120 in a fast, efficient and positive manner, substantially eliminating the set-up time normally required to assemble and align the upper and the lower die elements and the components for positioning the workpiece blank in the punch press for subsequent forming operations and in such a manner that the various components and asemblies can be secured to the base 120 by a relatively unskilled operator, thereby substantially reducing the set-up costs normally incurred in such operations.

The die fixture 12 is supported on the fixture support plate 22 of the punch press (not shown) such that the die fixture 12 is automatically moved to the loading station 16 and to the stamping station 18 via the control apparatus 14 in such a manner that the operator positions the workpiece blank on the lower die element 150 engaging the blank engaging surface 190 of the locators 172, and the die fixture 12 is automatically moved to the stamping station 18 wherein the workpiece blank is formed by the configurations of the upper punch element and the lower die element, the die fixture 12 being subsequently moved back to the loading station 16. The guard 119 remains stationarily interposed between the operator and the die fixture 12 during the stamping operation to virturally eliminate the possiblity of the operator being injured during the stamping operation.

When the lower die element 150 is initially utilized to form a workpiece blank 202, the lower die element 150 is secured to the base 120 via the fasteners 160 in an aligned position with respect to the upper punch element 20 connnected to ram of the punch press. After a sufficient number of workpiece blanks 150 have been formed in the punch press to assure that the lower die element 150 is properly positioned and aligned, the operator inscribes, etches or otherwise permanently marks a locating indicia on the lower die element 150, generally near each opening receiving one of the fasteners 160, each locating indicia identifying one particular base index opening 146 through which the fastener 160 is to be engaged, securing a portion of the lower die element 150 to the base 120. Each locating indicia is, in one form, comprised of one of the vertical locating indicia 156 and one of the horizontal locating indicia 158, thereby uniquely identifying one predetermined base index opening 146. Thus, the locating indicia on the lower die element 150 uniquely identify the proper, aligned position of the lower die element 150 so the lower die element 150 can be removed and subsequently assembled on the base 120 in a predetermined, aligned position utilizing the locating indicia.

The required, predetermined number of locators 172 are then positioned on the upper faces 162 and 174 of the horizontal and the vertical supports 152 and 154 in such a manner that the elongated finger elements 120 extend generally over the upper surface 122 of the base 120 and the blank engaging surfaces 190 are positioned to engage and positively locate the particular workpiece blank 202 with respect to the lower die element 150. More particularly, each locator 172 is positioned on one of the upper faces 162 and 174 such that the stop surface 192 engages one of the engaging surfaces 198 and 200 to properly position each blank engaging surface 190 to engage a portion of the workpiece blank 202 in a predetermined position of the workpiece blank 202 with respect to the lower die element 150.

As mentioned before each stop element 212 is, in a preferred form, removably secured to one of the locators 172 and, in this form, one stop element 212 is loosely fastened to each locator 172 via the fasteners 214 and each locator 172 is positioned on the upper faces 162 and 174 of the horizontal and the vertical supports 152 and 154 such that each blank engaging surface 190 engages a portion of the workpiece blank 202 in a predetermined position of the workpiece blank 202 with respect to the lower die element 150. In this position of the locators 172, each stop element 212 is slidingly moved to a position wherein the stop surface 192 thereof engages one of the engaging surfaces 198 and 200 of the horizontal and the vertical supports 152 and 154, the fasteners 214 slidingly moving along the elongated openings 208. Each stop element 212 is then secured to the locator 172 by tightening the fasteners 214. In one form, the stop elements 212 can be formed on the locators 172; however, the removable stop element construction provides a more flexible locator assembly.

Each locator 172 is positioned on one of the upper faces 162 and 174 of the horizontal and the vertical supports 152 and 154 in a direction, generally perpendicular to the direction located via the locating engagment between the stop surfaces 192 and the engaging surfaces 198 and 200, to a position wherein the blank engaging surfaces 190 engage predetermined portions of the workpiece blank 202, each locator 172 being then positioned such that the locator openings 194 of each locator 172 are aligned with predetermined horizontal or vertical support index openings 168 and 180. In this position each of the locators 172 is secured to one of the upper faces 162 and 174 via the fasteners 216 and the locating indicia 218 is inscribed or otherwise marked in close proximity to the elongated openings 208 for future reference.

In one form, mentioned before, locating indicia, similar to the locating indicia on the lower die element 150 and the locating indicia 218 marked on the locators 172, is also marked in close proximity to the openins in the hoizontal and the vertical supports 152 and 154 receiving the fasteners 160. In this form, the horizontal and the vertical suppots 152 and 154 are located on the upper face 122 of the base 120 and secured thereto via the fasteners 160, each of the fasteners 160 threadingly engaging the base index opening 146 indicated via th locating indicia to position the horizontal and the vertical supports 152 and 154 in predetermined positions on the base 120.

After the lower die element 150, the horizontal and the vertical supports 152 and 154 and the locators 172 have been initially assembled on the die fixture 12 and the various locating indicia marked thereon, each of these elements can be disassembled and subsequently re-assembled on the base 120 utilizing only the marked locating indicia to locate each of the elements. For example, one of the locators 172 has locating indicia 218 marked thereon, B3, generally near one of the elongated openings 208 and B4, generally near the other elongated opening 208. In this example, the operator positions the locator 172 on the horizontal support 152 to a position wherein the stop surface 192 engages the engaging surface 198 and the locator 172 is then moved to a position wherein the elongated openings 208 are aligned with the hoirzontal support index openings 168 corresponding to the locating indicia B3 and B4; that is the horizontal support index opening 168 in the horizontal row identified by the letter B, in the FIG. 3, and in the vertical row identified by the numeral 3, with respect to one elongated opening 208, and in the vertical row identified by the numeral 4, with respect to the other elongated opening 208. In this position of the locators 172, one of the fasteners 216 is inserted through each elongated opening 208 and into threaded engagement with horizontal support index opening 168 identified via the locating indicia 218 associated with the particular opening 208 securing the locator 172 to the upper face 162 of the horizontal support 152 in a predetermined position.

The locator 172 secured to the vertical support 154 has locating indicia 218 (C5 and D6) marked near the elongated openings 208. Thus, one of the fasteners 216 is disposed through one of the openings 208 into threaded engagement with the vertical support index opening 180 in the vertical row designated in FIG. 3 by the letter-reference D and in the horizontal row designated by the numeral-reference 6, and one of the fasteners 216 is disposed through the other opening 208 into threaded engagement with the vertical support index opening 180 in the vertical row designated in FIG. 3 by the letter-reference C and in the horizontal row deisgnated by the numeral-reference 5, thereby securing the locator 172 in an angularly extending, predetermined position on the upper face 174 of the vertical support 154

After the upper punch element 20 has been secured in the punch press and the lower die element 150, the horizontal and the vertical supports 152 and 154 have been secured to the base 120, and the locators 172 have been secured to the upper faces 162 and 174 of the horizontal and the vertical supports 152 and 154, the die fixture 12 is in as assembled, operating position for forming or shaping workpiece blanks. The operator will then controllingly adjust the loading station control 78 to set the time during which the die fixture 12 remains stationary at the loading station 16, the stamping station control 82 to set the time during which the die fixture 12 remains stationary at the stamping station 18, and the needle valve 84 to set the rate of travel of the die fixture 12 or more particularly, the rate of travel of the base 120 being moved in a loading direction 38 and in a stamping direction 40.

The timing actuator 68 is initially connected to the air supply 24 via the fixture control valve 44 and the loading station control 78, and actuated via the pilot connection 61, thereby holding the die fixture 12 at the loading station 16. In this position, the operator positions the workpiece blank generally on the lower die element 150 to a position wherein the workpiece blank 150 engages the blank engaging surfaces 190 of the locators 172, and releases the hand control valve 92 or, in other words, closes the hand control valve 92 to initiate the automatic operation of the die fixture and control apparatus 10.

When the hand control valve 92 is closed, the air supply 24 is disconnected from the pilot connection 61 and the trip arm 108 of the second direction control 90 is engaged by the trip plate 72 of the timing actuator 68, thereby opening the second direction control 90 and connecting the air supply 24 to the pilot connection 63, via the second direction control 90. When the fixture control valve 44 is actuated via the pilot connection 63, the fixture control valve 44 is positioned to connect the air supply 24 to the timing actuator 68 via the stamping station control 82, and to connect the air supply 24 to the die fixture actuator 26 via the conduit 58, the trip plate 72 of the timing actuator 68 being moved in a general direction 74 and the die fixture 12 being moved in a stamping direction 40 to a stamping position 18.

After the die fixture 12 has been moved to the stamping position 18, the trip plate 72 moving in the direction 74 will subsequently engage the trip arm 94 of the ram control valve 86 opening the ram control valve 86 and connecting the air supply 24 to the trip cylinder 96. When the air supply 24 is connected to the trip cylinder 96, the trip plate 98 will be moved in a direction 102 into engagement with the trip arm 104 of the ram actuator 30 and connecting the air supply 24 to the ram controller 28.

As mentioned before, the ram controller 28 is connected to the punch press to actuate the ram driving the upper punch element 20 into forming engagement with the workpiece blank 202 in an actuatd position of the ram controller 28 wherein the air supply 24 is connected thereto via the ram actuator 30. The trip plate 72 will continue to be moved in the direction 74 to a position wherein the trip plate 72 engages the trip arm 106 of the first direction control 88, thereby opening the first direction control 88 and connecting the air supply 24 to the pilot connection 61 of the fixture control valve 44 via the shuttle valve 110.

The fixture control valve 44 is positioned to connect the air supply 24 to the timing actuator 68 via the conduit 54 and the loading station control 78 when actuated via the pilot connection 61 receiving pressurized air via the first direction control 88. In this position of the the fixture control valve 44, the trip plate 72 is moved in a direction 76, and the air supply 24 is connected to the die fixture actuator 26 via the conduit 80 thereby moving the die fixture 12 in a loading direction 38 to a loading position 16.

The die fixture 12 will remain in the loading position 16 as the trip plate 72 is moved through the distances 118 and 116 in the direction 76 via the timing actuator 68. The trip plate 72 will then engage the trip arm 108 of the second direction control 90 to trip the second direction control 90 to the opened position connecting the air supply 24 to the pilot connection 63 of fixture control valve 44. When the fixture control valve 44 is actuated via the pilot connection 63 in the opened position of the second direction control 90, the air supply 24 is connected to the timing actuator 68 via the conduit 56 and to the die fixture actuator 26 via the conduit 58, the trip plate 72 being moved in a direction 74 and the die fixture 12 being moved to the loading station 16, in a manner described before.

The die fixture 12 will continue to be automatically moved to the loading station 16 and to the stamping station 20, in a manner described above, during the operation of the die fixture and control apparatus 10. If the operator, at any time, desires to stop the cyclic operation of die fixture and control apparatus 10, the operator merely actuates the hand control valve 92 to the opened position, thereby connecting the air supply 24 to the pilot connection 61 via the shuttle valve 110. In this position of the hand control valve 92 and the fixture control valve 44, the die fixture 12 will be moved to the loading position 16 via the die fixture actuator 26 and will remain in this position until the operator releases or, in other words, closes the hand control valve 92 to again initiate the cyclic operation of the die fixture and control apparatus 10.

The time required for the trip plate 72 to be moved in a direction 74 via the timing actuator 68 through the distances 116 and 118 into engagement with the trip arm 106 of the first control valve 88 determines the time during which the die fixture 12 remains in the stamping station 18 during each cycle of the die fixture 12, sometimes referred to herein as the stamping station delay time. The stamping station delay time is partially controlled by the distances 116 and 118, the distance 116 being more particularly determined to assure the die fixture 12 has been moved to stamping station 18 prior to the actuation of the ram of the punch press. Assuming the distances 116 and 118 are initially set to predetermined values, the stamping station delay time is then variably adjusted to predetermined values via the stamping station control 82 and, more particularly, by adjusting the flow rate of the pressurized air from the air supply 24 through the stamping station control 82 via the conduit 56, thereby controlling the rate at which the pressurized air enters the timing actuator 68 via the conduit 56 to control the rate at which the trip plate 72 is moved in the direction 74.

The time required for the trip plate 72 to be moved in a direction 76 via the timing actuator 68 through the distances 116 and 118 into engagement with the trip arm 108 of the second control valve 90 determines the time during which the die fixture 12 remains in the loading station 16 during each cycle at the die fixture 12, sometimes referred to herein as the "loading station delay time." The loading station delay time is also partially controlled by the distances 116 and 118 and assuming the distances 116 and 118 are initially set to predetermined values, the loading station delay time is then variably adjustable to predetermined values via the loading station control 78, thereby controllably adjusting the flow rate of the pressurized air from the air supply 24 through the loading station control 78 via the conduit 54 to control the rate at which the pressurized air enters the timing actuator 68 via the conduit 54 and the rate at which the trip plate 72 is moved in the direction 76.

The control of the flow rate of the pressurized air through the loading station control 78 and the stamping station control 83 thus controls the loading station delay time and the stamping station delay time, respectively. Further, since the loading and the stamping station controls 78 and 92 each are constructed to control the flow of fluid in only one direction therethrough, the loading and the stamping station controls 78 and 82 each provide a virtually non-obstructed flow path for discharging fluid from the timing actuator 68 during the operation of the control apparatus 14 and, thus, the loading and the stamping station controls 78 and 82 adjustably control the loading station delay time and the stamping station delay time, independent of the setting of the other control.

The rate of travel of the die fixture 12 moving to the loading station 16 and to the stamping station 18 is controllable by adjusting the flow rate of the pressurized air through the needle valve 84. In one position of the fixture control valve 44, the pressurized air flows through the needle valve 84 to the die fixture actuator 26 and, in one other position of the fixture control valve 44, the pressurized air is discharged from the die fixture actuator 26 through the needle valve 84, the needle valve 84 thereby controlling the flow of pressurized air generally within the die fixture actuator 26 in both actuated positions of the fixture control valve 44.

Description of FIGS. 5 Through 7

Shown in FIGS. 5 through 7 is a modified die fixture 12b having a modified base 120 supported on a modified fixture support plate 22b of the punch press (not shown) which is constructed to support a modified lower die element 150b. The fixture support plate 22b includes an opening 234 for accommodating an air cushion pad (not shown) or the like to be utilized in cooperation with the modified lower die element 150b, the utilization and construction of air cushion pads being well known in the art.

The lower die element 150b includes a pad 236 disposed in the form groove 237 therein (the form groove being shown in FIGS. 5, 6 and 7 as being generally U-shaped, for the purpose of example), the upper punch element (not shown) being modified to engage the workpiece blank and force a portion thereof into the form groove 237 imparting a U-shaped form at a predetermined portion of the workpiece blank. A plurality of air cushion pin holes 238 are formed in the upper face 122b of the base 120, the air cushion pin holes 238 being spaced generally between the base index openings 146. More particularly, each of the air cushion pin holes 238 in the base 120 are disposed to be in alignment with one of a plurality of air cushion pin holes 240 formed through the lower die element 150b, in an assembled position of the lower die element 150b to the base 120. The air cushion pin holes 238 (two air cushion pin holes 238 being shown in the drawings) intersect the portion of the lower die element 150b formed by the form groove 237 therein, and include a portion having a larger diameter with respect to the diameter of the remaining portion of the air cushion pin holes 238, thereby forming an annular ledge 242 in each of the air cushion pin holes 238, for reasons to be made more apparent below.

Each annular ledge 242 is sized and positioned to retainingly engage one end of a spring 244 disposed about a cushion pin 246, the opposite end of the spring 244 engaging the head of the cushion pin 246 biasing each cushion pin 246 in a general direction 248. Each cushion pin 246 is disposed in one of air cushion pin holes 240 and partially disposed through the aligned air cushion pin hole 238 in base 120. Thus, each cushion pin 246 is biased in a general direction 248 into engagement with the pad 236 via the spring 244 disposed thereabout. In the stamping station 18 of the die fixture 12b, the cushion pins are disposed generally over the cushion pad (not shown) disposed in the opening 234 of the fixture support plate 22b, for reasons to be made more apparent below.

The die fixture 12b operates substantially similar to the die fixture 12, described before, the salient difference with respect to the operation of the die fixture 12b being during the stamping operation. In the stamping station 18 position of the die fixture 12b, the upper punch element engages the workpiece blank and forces a portion of the workpiece blank against the pad 236 and into the form groove 237 of the lower die element 150b. As the pad 236 is forced in a general direction 248, the pad 236 engages the head of the cushion pins 246 and forces each of the cushion pins 246 in a direction 248, generally against the biasing force of the springs 244, a portion of each of the cushion pins 246 being disposed in the opening 234 and engaging a portion of the air cushion pad movably disposed therein.

After the workpiece blank has been formed, the ram and upper punch element connected thereto are moved from engagement with the workpiece blank, and each of the cushion pins 246 are biased in a direction 250 via the air cushion pad and augmentingly biased in the direction 250 via the springs 244. Each of the cushion pins 246 biasingly engage the pad 236 moving the pad 236 and formed portion of the workpiece blank in a direction 250 to generally remove the workpiece blank from the lower die element 150b, the die fixture 12b being subsequently moved to the loading station 16 for receiving another workpiece blank.

Embodiment of FIG. 8

The modified die fixture 12c, shown in FIG, 8, is constructed substantially the same as the die fixture 12, described before, the salient difference being that the modified base support 126c includes a pair of channels 254, one of the channels 254 being disposed generally near the side 130c of the base 120c and the other channel 254 being disposed generally near the side 132c of the base 120c. Each channel 254 includes a portion overlapping a portion of the upper face 122 of the base 120c, generally adjacent one of the sides 130c and 132c thereof. Each of the channels 254 of the base support 126c retains the base 120c in a predetermined path of travel, the lower face 124c of the base 120c slidingly engaging the upper surface of the fixture support plate 22 as the die fixture 12c is moved to the loading station 16 and the stamping station 18, in a manner similar to that described before with respect to the die fixture and control apparatus 10.

Changes may be made in the construction and the operation of the various embodiments of the invention as disclosed herein without departing from the spirit and the scope of the invention as defined in the following claims.

What is claimed is:

1. A die fixture for positioning a workpiece blank formed in a punch press having an upper punch element movable into engagement with the workpiece blank supported on a lower die element in an actuated stamping position of the punch press, comprising:
    a base, having an upper and a lower face;
    support means connected to the upper face of the base, having an engaging surface formed thereon and a plurality of index openings formed in the upper face thereof, each of the index openings being identifiable via locating indicia;
    locators, each locator having a blank engaging surface and a stop surface and being secured to a predetermined assembled position on the upper surface of the support means, the stop surfaces of each of the locators engaging the engaging surface of the support means to position each of the locators in one direction;
    means removably securing each of the locators to the upper surface of the support means via predetermined index openings to locate each of the locators in one other direction to securedly position the blank engaging surfaces of the locators in a predetermined assembled position, each blank engaging surface engaging a portion of the workpiece blank for positioning the workpiece blank in a predetermined position;
    base support means secured to a portion of the punch press, having a portion movably supporting the base and defining a guide path for moving the base in a loading direction to a loading station and in a stamping direction to a stamping station, the lower die element being aligned with the upper punch element in the stamping station position of the base for imparting a predetermined shape to a portion of the workpiece blank in an actuated stamping position of the punch press and the lower die element being positioned for receiving a workpiece blank in the loading station position thereof; and
    control apparatus, having a portion connected to the punch press and a portion connected to the base, automatically moving the base to the loading position, in one actuated position thereof, and moving the base to the stamping station position actuating the punch press in a stampng position, in one other actuated position thereof, comprising:
    timing control means for variably adjusting the loading station delay time wherein the control apparatus maintains the base positioned at the loading station and variably adjusting the stamping station delay time wherein the control apparatus maintains the base positioned at the stamping station.

2. A die fixture for positioning a workpiece blank formed in a punch press having an upper punch element movably into engagement with the workpiece blank supported on a lower die element in an actuated stamping position of the punch press, comprising:
    a base, having an upper and a lower face;
    support means connected to the upper face of the base, having an engaging surface formed thereon and a plurality of index openings formed in the upper face thereof, each of the index openings being identifiable via locating indicia;
    locators, each locator having a blank engaging surface and a stop surface and being secured to a predetermined assembled position on the upper surface of the support means, the stop surfaces of each of the locators engaging the engaging surface of the support means to position each of the locators in one direction;
    means removably securing each of the locators to the upper surface of the support means via predetermined index openings to locate each of the locators in one other direction to securedly position the blank engaging surfaces of the locators in a predetermined assembled position, each blank engaging surface engaging a portion of the workpiece blank for positioning the workpiece blank in a predetermined position;
    base support means secured to a portion of the punch press, having a portion movably supporting the base and defining a guide path for moving the base in a loading direction to a loading station and in a stamping direction to a stamping station, the lower die element being aligned with the upper punch element in the stamping station position of the base for imparting a predetermined shape to a portion of the workpiece blank in an actuated stamping position of the punch press and the lower die element being positioned for receiving a workpiece blank in the loading station position thereof; and
    control apparatus, having a portion connected to the punch press and a portion connected to the base, automatically moving the base to the loading position, in one actuated position thereof, and moving the base to the stamping station position actuating the punch press in a stamping position, in one other actuated position thereof, comprising: means for variably adjusting the rate of travel of the base moving to the loading station position and to the stamping station position.

3. A die fixture for positioning a workpiece blank formed in a punch press having an upper punch element movably into engagement with the workpiece blank supported on a lower die element in an actuated stamping position of the punch press, comprising:

a base, having an upper and a lower face;

support means connected to the upper face of the base, having an engaging surface formed thereon and a plurality of index openings formed in the upper face thereof, each of the index openings being identifiable via locating indicia;

locators, each locator having a blank engaging surface and a stop surface and being secured to a predetermined assembled position on the upper surface of the support means, the stop surfaces of each of the locators engaging the engaging surface of the support means to position each of the locators in one direction;

means removably securing each of the locators to the upper surface of the support means via predetermined index openings to locate each of the locators in one other direction to securely position the blank engaging surfaces of the locators in a predetermined assembled position, each blank engaging surface engaging a portion of the workpiece blank for positioning the workpiece blank in a predetermined position;

base support means secured to a portion of the punch press, having a portion movably supporting the base and defining a guide path for moving the base in a loading direction to a loading station and in a stamping direction to a stamping station, the lower die element being aligned with the upper punch element in the stamping station position of the base for imparting a predetermined shape to a portion of the workpiece blank in an actuated stamping position of the punch press and the lower die element being positioned for receiving a workpiece blank in the loading station position thereof; and control apparatus, having a portion connected to the punch press and a portion connected to the base, automatically moving the base to the loading position, in one actuated position thereof, and moving the base to the stamping station position actuating the punch press in a stamping position, in one other actuated position thereof, comprising:

air supply means supplying pressurized control air;

a die fixture actuator connected to the air supply means, having a portion reciprocatingly disposed therein, having a portion connected to the base, the die fixture actuator moving the base to the laoding station position, in one actuated position thereof, and moving the base to the stamping station position, in one other actuated position thereof;

a fixture control valve interposed between the air supply means and the die fixture actuator, the fixture control valve having one actuated position connecting the air supply means to the die fixture actuator actuating the die fixture actuator to move the base to the loading station position and one other actuated position connecting the air supply means to the die fixture actuator actuating the die fixture actuator to move the base to the stamping station position;

means interposed between the fixture control valve and the die fixture actuator for variably adjusting the flow of pressurized air between the die fixture actuator and the fixture control valve to control the rate of travel of the base moving to the loading station position and the stamping station position; and means connected to the die fixture actuator for actuating the die fixture actuator.

4. An improved die fixture and control apparatus for positioning a workpiece blank to be formed in a punch press having an upper punch element movable into engagement with the workpiece blank in an actuated stamping position of the punch press, comprising:

a base, having an upper face;

a lower die element secured to the upper face of the base;

means positioning workpiece blanks in predetermined positions on a portion of the lower die element;

base support means secured to a portion of the punch press and having a portion engaging the base to provide a guide path for the base; and control apparatus, having a portion connected to the base, automatically moving the base to a loading station position for loading workpiece blanks in predetermined positions generally on the lower die element, on one actuated position, and moving the base to a stamping station position for imparting a predetermined shape to the workpiece blank via the engagement of the upper punch element in an actuated stamping position of the punch press, in one other actuated position, the control apparatus comprising:

timing means for variably adjusting the loading station delay time wherein the control apparatus maintains the base positioned at the loading station and variably adjusting the stamping station delay time wherein the control apparatus maintains the base positioned at the stamping station.

5. An improved die fixture and control apparatus for positioning a workpiece blank to be formed in a punch press having an upper punch element movable into engagement with the workpiece blank in an actuated stamping position of the punch press, comprising:

a base, having an upper face;

a lower die element secured to the upper face of the base;

means positioning workpiece blanks in predetermined positions on a portion of the lower die element;

base support means secured to a portion of the punch press and having a portion engaging the base to provide a guide path for the base; and control apparatus, having a portion connected to the base, automatically moving the base to a loading station position for loading workpiece blanks in predetermined positions generally on the lower die element, in one actuated position, and moving the base to a stamping station position for imparting a predetermined shape to the workpiece blank via the engagement of the upper punch element in an actuated stamping position of the punch press, in one other actuated position, the control apparatus comprising:

means for variably adjusting the rate of travel of the base moving to the loading station position and to the stamping station position.

6. An improved die fixture and control apparatus for positioning a workpiece blank to be formed in a punch press having an upper punch element movable into engagement with the workpiece blank in an actuated stamping position of the punch press, comprising:

a base, having an upper face;

a lower die element secured to the upper face of the base;

means positioning workpiece blanks in predetermined positions on a portion of the lower die element;

base support means secured to a portion of the punch press and having a portion engaging the base to provide a guide path for the base; and control apparatus, having a portion connected to the base, automatically moving the base to a loading station position for loading workpiece blanks in predetermined positions generally on the lower die element, in one actuated position, and moving the base to a stamping station position for imparting a predetermined shape to the workpiece blank via the engagement of the upper punch element in an actuated stamping position of the punch press, in one other actuated position, the control apparatus comprising:

air supply means supplying pressurized control air;

a die fixture actuator connected to the air supply means, having a portion reciprocatingly disposed therein, having a portion connected to the base, the die fixture actuator moving the base to the loading station position, in one actuated position thereof, and moving the base to the stamping station position, in one other actuated position thereof; and means interposed between the fixture control valve and the die fixture actuator for variably adjusting the flow of pressurized air between the die fixture actuator and the fixture control valve to control the rate of travel of the base moving to the loading station position and the stamping station position.

7. The die fixture actuator of claim 6 wherein the fixture control valve includes: a pair of pilot connections connected to the air supply means, the fixture control valve being positioned to connect the air supply to the die fixture actuator for moving the base to the loading station when receiving pressurized air at one of the pilot connections, and being positioned to connect the air supply to the die fixture actuator for moving the base to the stamping station when receiving pressurized air at the other pilot connection; and means interposed between the air supply means and the pilot connections of the fixture control valve connecting the air supply means to one of the pilot connections in one position thereof and connecting the air supply means to the other pilot connection in one other position thereof.

8. The die fixture of claim 7 wherein the means interposed between the pilot connections of the fixture control valve and the air supply means includes:

a first direction control, having an opened and a closed position, interposed between the pilot connection actuating the fixture control valve to connect the air supply to the die fixture actuator to move the base to the loading station position and connecting the air supply to the pilot connection connected thereto in an opened position thereof;

means to open and close the first direction control;

a second direction control, having an opened and a closed position, interposed between the pilot connection actuating the fixture control valve to connect the air supply to the die fixture actuator to move the base to the stamping station position and connecting the air supply to the pilot connection connected thereto in an opened position thereof; and means to open and close the second direction control.

9. The die fixture of claim 8 wherein the first direction control includes: a trip arm connected thereto to position the first direction control in the opened position in an engaged position of the trip arm; and wherein the second direction control includes: a trip arm connected thereto to position the second direction control in the opened position in an engaged position thereof; and wherein the means opening and closing the first and the second direction control are each defined further to include:

a timing actuator connected to the air supply means, having a portion reciprocatingly disposed therein, and being reciprocated to engage the trip arm of the first direction control in one actuated position, and being reciprocated to engage the trip arm of the second direction control in one other actuated position; and wherein the fixture control valve is interposed between the air supply means and the timing actuator connecting the air supply means to the timing actuator means reciprocating the portion thereof to engage the trip arm of the first direction control when actuated via the pilot connection connected to the second direction control and reciprocating the portion thereof to engage the trip arm of the second direction control when actuated via the pilot connection connected to the first direction control, the first and the second direction control thereby controlling the actuated position of the fixture control valve to automatically move the base to the loading station position and the stamping station position at controlled intervals of time.

10. The die fixture of claim 9 wherein the control apparatus is defined further to include:

a loading station control interposed between the fixture control valve and the timing actuator for variably adjusting the flow of pressurized air to the timing actuator to variably control the rate at which the reciprocating portion moves to engage the trip arm of the second direction control, thereby controlling the loading station delay time wherein the control apparatus maintains the base positioned at the loading station; and a stamping station control interposed between the fixture control valve and the timing actuator for variably adjusting the flow of pressurized air to the timing actuator to variably control the rate at which the reciprocating portion moves to engage the trip arm of the first direction control, thereby controlling the stamping station delay time wherein the control apparatus maintains the base positioned at the stamping station.

11. The die fixture apparatus of claim 9 wherein the control apparatus is defined further to include:

a ram controller connected to the punch press and to the air supply means positioning the punch press in an actuated stamping position when receiving pressurized air from the air supply means;

a ram actuator, having an opened and a closed position, interposed between the air supply means and the ram controller connecting the pressurized air to the ram controller in an opened position thereof; and means actuating the ram actuator to the opened position in one position thereof; and wherein the reciprocating portion of the timing actuator actuates the means actuating the ram actuator when moving to engage the trip arm of the first direction control.

12. The die fixture apparatus of claim 8 wherein the control apparatus is defined further to include:

a hand control valve, having an opened and a closed position, interposed between the air supply means and the pilot connection fo the fixture control valve actuating the fixture control valve to connect the air supply means to the die fixture actuator to move the base to the loading station position and connecting the air supply means to the pilot connection connected thereto in an opened position thereof; and a shuttel valve interposed between the first direction control, the hand control valve and the pilot connection of the fixture control valve connected thereto providing a flow path therethrough between the hand control valve and the pilot connection in an opened position at the hand control valve and providing a flow path therethrough between the first direction control and the pilot connection in an opened position of the first direction control.

13. The die fixture of claim 4 defined further to include:

a pair of flange connectors connected to opposite sides of the base and having a guide flange means extending therefrom, a guide opening being formed through the guide flange means; and a fixture support plate secured to a portion of the punch press; and wherein the base support means includes:

a pair of guide rods secured to the fixture support plate, each guide rod slidingly extending through the guide opening of one of the flange connectors, the base being slidingly supported on the guide rods via the flange connectors to be moved to the loading station position and to the stamping station position.

14. The die fixture of cliam 13 wherein the guide rods slidingly support the base a distance generally above the fixture support plate.

15. he die fixture of claim 4 defined further to include: a fixture support plate secured to a portion of the punch press; and wherein the base is slidingly supported on the fixture support plate to be moved to the loading station position and the stamping station position, and wherein the base support means includes: a pair of channels disposed generally adjacent opposite sides of the base, each channel secured to the fixture support plate and having a portion overlapping an adjacent portion of the upper face of the base.

16. The die fixture of claim 4 defined further to include: a fixture support plate secured to a portion of the punch press, having an air cushion opening formed in a portion thereof for accommodating an air cushion pad, an upper punch element movable into engagement with the workpiece blank in an actuated stamping position of the punch press; and wherein the base includes: a plurality of spaced air cushion pin openings formed therethrough and positioned to be aligned with the air cushion opening in a stamping station position of the base; and wherein the die fixture is defined further to include:

a lower die element secured to the upper face of the base having at least one air cushion pin opening formed through a portion thereof aligned with one of the air cushion pin openings in the base, the air cushion pin openings through the lower die element having a larger diameter portion forming an annular ledge therein;

a cushion pin disposed in each air cushion pin opening of the lower die element and having a portion partially disposed in the aligned air cushion pin opening of the base;

a spring disposed about each cushion pin having a portion engaging one of the cushion pins and a portion engaging one of the annular ledges, each spring biasing one of the cushion pins in a direction generally away from the fixture support plate, each cushion pin positioned to be biased in a direction generally toward the fixture support plate via a portion of the workpiece blank engaged by the upper punch element generally against the biasing force of the springs to a position disposing a portion of each cushion pin generally within air cushion opening in the fixture support plate, each of the cushion pins being biased by the springs in a direction generally away from the fixture support plate to augment removal of the workpiece blank from the lower die element after the stamping operation.

17. The die fixture of claim 4 defined further to include:

a guard encompassing a substantial portion of the lower die element and the upper punch element in the stamping station position of the base, the guard having a guard opening formed through a portion thereof providing a minimum clearance between the guard edge formed by the guard opening and the base, the lower die element and the workpiece blank, the base being movable through the guard opening to a stamping station position and a loading station position.

18. An improved die fixture and control apparatus for positioning a workpiece blank to be formed in a punch press having an upper punch element movable into engagement with the workpiece blank in an actuated stamping position of the punch press, comprising:

a base, having an upper face;

a lower die element secured to the upper face of the base;

means positioning workpiece blanks in predetermined positions on a portion of the lower die element;

base support means secured to a portion of the punch press and having a portion engaging the base to provide a guide path for the base; and control apparatus, having a portion connected to the base, automatically moving the base to a loading station position for loading workpiece blanks in predetermined positions generally on the lower die element, in one actuated position, and moving the base to a stamping station position for imparting a predetermined shape to the workpiece blank via the engagement of the upper punch element in an actuated stamping position of the punch press, in one other actuated position, the control apparatus, comprising:

a die fixture actuator, having a portion connected to the base, moving the base to the loading station position, in one actutated position thereof, and moving the base to the stamping station position, in one other actuated position thereof;

means to actuate the die fixture actuator;

timing means for variably adjusting the loading station delay time wherein the control apparatus maintains the base positioned at the loading station and variably adjusting the stamping station delay time wherein the control apparatus maintains the base positioned at the stamping station; and means for variably adjusting the rate of travel of the base moving to the loading station position and to the stamping station position.

19. The die fixture and control apparatus of claim 18 wherein the means for positioning the workpiece blanks is defined further to include:

support means connected to the upper face of the base, having an engaging surface formed thereon and a plurality of index openings formed in an upper face thereof, each of the index openings being identifiable via locating indicia;

locators, each locator having a blank engaging surface and a stop surface and being secured to a predetermined assembled position on the upper surface of the support means, the stop surfaces of each of the locators engaging the engaging surface of the support means to position each of the locators in one direction; and means removably securing each of the locators to the upper surface of the support means via predetermined index openings to locate each of the locators in one other direction to securely position the blank engaging surfaces of the locators in a predetermined assembled position, each blank engaging surface engaging a portion of the workpiece blank for positioning the workpiece blank in a predetermined position.

20. The die fixture and control apparatus of claim 19 wherein the means to actuate the die fixture actuator is defined further to include:

air supply means supplying pressurized control air connected to the die fixture actuator;

a fixture control valve interposed between the air supply means and the die fixture actuator, having a pair of pilot connections connected to the air supply means, the fixture control valve connecting the air supply means to the die fixture actuator actuating the die fixture actuator to move the base to the loading station position when receiving pressurized air via one of the pilot connections, and connecting the air supply means to the die fixture actuator actuating the die fixture actuator to move the base to the stamping station position when receiving pressurized air via the other pilot connection; and wherein the means for variably adjusting the rate of travel of the base includes: needle valve means interposed between the fixture control valve and the die fixture actuator for variably adjusting the flow of pressurized air between the die fixture actuator and the fixture control valve to control the rate of travel of the base; and wherein the timing means is defined further to include:

a first direction control, having an opened and a closed position, and a trip arm opening the first direction control in an engaged position, the first direction control interposed between the pilot connection actuating the fixture control valve to connect the air supply to the die fixture actuator to move the base to the loading station position and connecting the air supply to the pilot connection connected thereto in an opened position thereof;

a second direction control, having an opened and a closed position, and a trip arm opening the second direction control in an engaged position, the second direction control interposed between the pilot connection actuating the fixture control valve to connect the air supply to the die fixture actuator to move the base to the stamping station position and connecting the air supply to the pilot connection connected thereto in an opened position thereof;

a timing actuator connected to the air supply means having a portion reciprocatingly disposed therein and being reciprocated to engage the trip arm of the first direction control, in one actuated position, and being reciprocated to engage the trip arm of the second direction control, in one other actuated position; and wherein the fixture control valve is interposed between the air supply means and the timing actuator connecting the air supply means to the timing actuator means reciprocating the portion thereof to engage the trip arm of the first direction control when actuated via the pilot connection connected to the second direction control and reciprocating the portion thereof to engage the trip arm of the second direction control when actuated via the pilot connection connected to the first direction control, the first and the second direction control thereby controlling the actuated position of the fixture control valve to automatically move the base to the loading station position and the stamping station position at controlled intervals of time; and wherein the timing means is defined further to include:

a loading station control interposed between the fixture control valve and the timing actuator for variably adjusting the flow of pressurized air to the timing actuator to variably control the rate at which the reciprocating portion moves to engage the trip arm of the second direction control, thereby controlling the loading station delay time wherein the control apparatus maintains the base positioned at the loading station; and a stamping station control interposed between the fixture control valve and the timing actuator for variably adjusting the flow of pressurized air to the timing actuator to variably control the rate at which the reciprocating portion moves to engage the trip arm of the first direction control, thereby controlling the stamping station delay time wherein the control apparatus maintains the base positioned at the stamping station.

21. The die fixture and control apparatus of claim 20 wherein the control apparatus is defined further to include:

a ram controller connected to the punch press and to the air supply means positioning the punch press in an actuated stamping position when receiving pressurized air from the air supply means;

a ram actuator, having an opened and a closed position, interposed between the air supply means and the ram controller connecting the pressurized air to the ram controller in an opened position thereof; and means actuating the ram actuator to the opened position in one position thereof; and wherein the reciprocating portion of the timing actuator actuates the means actuating the ram actuator when moving to engage the trip arm of the first direction control.

* * * * *

PO-1050
(5/69)

UNITED STATES PATENT OFFICE
CERTIFICATE OF CORRECTION

Patent No. 3,777,602           Dated December 11, 1973

Inventor(s) Charles J. Youra

It is certified that error appears in the above-identified patent and that said Letters Patent are hereby corrected as shown below:

Column 4, line 21, "an" should be --and--.

Column 6, line 19, "towad" should be --toward--.

Column 6, line 21, "th" should be --the--.

Column 6, line 32, "actuating" should be --acting--.

Column 7, line 46 "the" first occurrence should be -- The --.

Column 8, line 3, "connectd" should be --connected--.

Column 8, line 46, "5" should be --15--.

Column 10, line 57, "paticularly" should be --particularly--.

Column 12, line 55, after "to" insert --a--.

Column 13, line 13, "virturally" should be --virtually--.

Column 14, line 28, "openins" should be --openings--.

Column 14, line 29, "hoizontal" should be --horizontal--.

Column 14, line 31, "suppots" should be --supports--.

Column 14, line 34, "th" should be --the--.

Column 15, line 23, "as" should be --an--.

Column 16, line 7, "actuatd" should be --actuated--.

Column 16, line 21, "the the" should be --the--.

Column 17, line 33, "83" should be --82--.

PO-1050
(5/69)

UNITED STATES PATENT OFFICE
CERTIFICATE OF CORRECTION

Page 2

Patent No. 3,777,602           Dated December 11, 1973

Inventor(s) Charles J. Yours

It is certified that error appears in the above-identified patent and that said Letters Patent are hereby corrected as shown below:

Column 20, line 6, claim one, "stampng" should be -stamping-.

Column 21, line 47, claim three, "laoding" should be -loading-.

Column 22, line 21, claim four, "on" should be -in-.

Column 25, line 11, claim 12, "fo" should be -of-.

Column 25, line 18, claim 12, "shuttel" should be -shuttle-.

Column 25, line 43, claim 14, "cliam" should be -claim-.

Column 25, line 46, claim 15, "he" should be -The-.

Signed and sealed this 11th day of June 1974.

(SEAL)
Attest:

EDWARD M. FLETCHER, JR.
Attesting Officer

C. MARSHALL DANN
Commissioner of Patents